Oct. 23, 1951 J. K. FINCKE 2,572,605
PROCESS FOR SULFONATION OF ORGANIC COMPOUNDS
Filed April 1, 1948
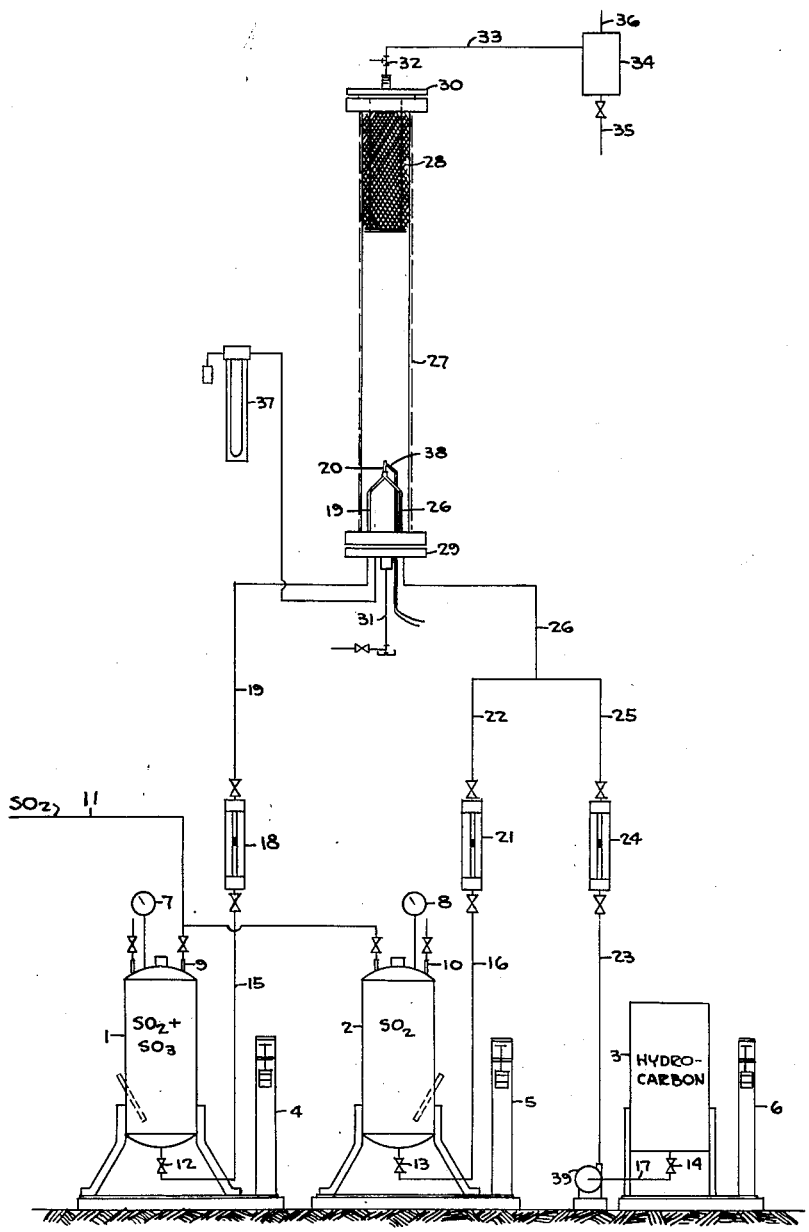
JOHN K. FINCKE INVENTOR.
BY Patented Oct. 23, 1951

2,572,605

UNITED STATES PATENT OFFICE 2,572,605

PROCESS FOR SULFONATION OF ORGANIC COMPOUNDS

John K. Fincke, Dayton, Ohio, assignor to Monsanto Chemical Company, St. Louis, Mo., a corporation of Delaware Application April 1, 1948, Serial No. 18,448

6 Claims. (Cl. 260—503)

This invention relates to a process for sulfonating organic compounds.

An object of the present invention is to provide a process for sulfonating organic compounds which is capable of producing sulfonated or polysulfonated organic products. A further object is to provide a process for carrying out the sulfonation reaction substantially instantaneously.

The present invention consitutes an improvemet upon the process for sulfonating organic compounds involving the use of sulfur dioxide as a solvent and $SO_3$ as the sulfonating agent. The present process can be carried out in relatively simple equipment and at a high rate of throughput.

In prior processes it has been proposed to carry out sulfonation in liquid sulfur dioxide by indirectly precooling streams of the sulfonating agent and the material to be sulfonated, combining the streams in a zone at sub-atmospheric temperatures, then flowing the stream into a second zone at a temperature higher than the first zone and then diluting or mixing the product with water in order to stop the reaction.

According to my invention, sulfonation is accomplished substantially instantaneously by mixing together a stream of liquid $SO_2$ containing a dissolved organic material which contains at least one grouping of the type: —CH=CH—, and a stream of liquid $SO_2$ containing dissolved $SO_3$. The streams are mixed together in a mixing zone comprising preferably a short, tubular nozzle and then sprayed out into a chamber maintained at substantially atmospheric pressure. I have found that when operating in this manner the pressure drop across the spray nozzle is at least 40 pounds per square inch. As a result of the exothermic reaction heat generated by the sulfonation reaction, evaporation of an equivalent amount of the liquid $SO_2$ occurs in the nozzle, the formation of gaseous $SO_2$ in this manner accounting for the observed large pressure drop therein. The resulting mixture of sulfonated product and vaporized $SO_2$ leaving the nozzle at high velocity sprays into the collection chamber, which is designed to separate the finely divided sulfonated products from the vaporized gaseous $SO_2$. Any liquid $SO_2$ leaving the nozzle will evaporate in the collection chamber and will lower the temperature thereof, but will not materially affect the nozzle temperature. Both products, namely, the sulfonated organic product and the vaporized sulfur dioxide may thereafter be recovered in any suitable manner.

The pressure drop across the nozzle when the sulfonation reaction takes place in the nozzle is at least 200 times and may be as high as 500 times that observed for the same mass flow of liquid. The pressure drop depends upon the rate of evaporating $SO_2$ which in turn depends upon the heat of sulfonation and rate of reaction of the hydrocarbons treated and to a lesser extent upon the degree of dilution of the reactants. The temperature of sulfonation, which may be controlled by the amount of $SO_2$ used as solvent for the reactants, should be at least 20° C. and not substantially in excess of 75° C. By using smaller proportions of solvent $SO_2$, the temperature of sulfonation will be higher than when using larger quantities and vice versa. Except as explained above, the proportion of $SO_2$ present during the reaction is not critical as far as the reaction itself is concerned. However, as stated, by varying the proportions of liquid $SO_2$ used as the solvent the temperatures may be varied within the range indicated.

By reason of the fine state of subdivision of the sulfonation product leaving the nozzle, any liquid or gaseous $SO_2$ in the product is rapidly and completely separated and removed therefrom.

As contrasted with previous processes, the present process of sulfonation takes place under adiabatic conditions; in other words, there is no gain or loss of heat to the system. The reaction takes place at temperatures of at least 20° C., but below 70° C., and is completed as far as it is possible to ascertain in the space of time required for passage of the material through the short spray nozzle.

By means of the present invention it is possible to sulfonate any hydrocarbon which is soluble in liquid sulfur dioxide at room or at slightly elevated temperatures and which contains at least one group of the type: —CH=CH—. The hydrocarbons may be either aliphatic or aromatic, or mixtures of these compounds. Specific compounds which contain the above grouping and which may be treated by my process are the following: benzene, naphthalene, anthrazene, biphenyl, toluene, ethylbenzene, dodecyl benzene, alkylated naphthalenes, alkylated anthracene, or alkylated biphenyl, etc. Aliphatic hydrocarbons may be any olefin such as ethylene, propylene, butylene, isobutylene, amylene, octene, decene, dodecene, tetradecene, hexadecene, octadecene, etc. Olefins containing more than one unsaturated grouping may also be treated by the hereindescribed process.

We have found that the $SO_3$ combines substantially quantitatively with the unsaturated grouping in the molecule and that it is possible to introduce as many $SO_3$ groups as there are replaceable hydrogens present in the groups of the type: —CH=CH— present in the molecule. In order to do this, it is necessary only to proportion the $SO_3$ present in the sulfur dioxide liquid stream entering the mixing nozzle so as to contain the number of molecules of $SO_3$, which it is desired to introduce into the organic compound to be sulfonated.

As will be noted above, the hydrocarbons which may be sulfonated are characterized by possessing the group: —CH=CH— in the molecule. This group may be a part of an olefin molecule or it may be a part of an aromatic ring. The aromatic sulfonic acids, upon neutralization by alkalies, will consist of the aromatic alkali metal sulfonates. The olefinic products, upon neutralization with an alkali, will consist of the alkane hydroxy alkali metal sulfonates.

The process is carried out by preparing separate solutions of sulfur trioxide in liquid $SO_2$ and of the hydrocarbon to be sulfonated dissolved in liquid $SO_2$. The solutions are stored in pressure vessels under a pressure corresponding substantially to the vapor pressure of the respective solutions. From the pressure vessels the solutions are withdrawn by means of suitable pipes which connect with a nozzle of relatively short length. The solutions flowing into the nozzle become intimately mixed, sulfonation of the hydrocarbon takes place and heat of reaction is thereupon liberated. The liberated heat causes vaporization of the $SO_2$ within the nozzle. The large volume of gas liberated within the nozzle causes a pressure drop, which is considerably in excess of the pressure drop which is observed in the case of sulfur dioxide solutions flowing through the nozzle. The pressure drop across the nozzle has been found to be at least 40 pounds per square inch and usually less than 100 pounds per square inch.

The mixture of gaseous $SO_2$ and liquid sulfonation product leaving the nozzle is collected in a gas-liquid separating chamber operating at substantially atmospheric pressure. The vaporized $SO_2$ being water-free is economically recovered, compressed and liquefied without further purification for reuse in the process. The organic sulfonic acid is neutralized with caustic alkali to produce the alkali metal salts of the corresponding sulfonic acids.

Reference is made to the single figure of the drawing showing apparatus suitable for carrying out the present process. Referring to the drawing, numeral 1 indicates a tank suitable for containing a sulfur dioxide solution of sulfur trioxide. Tank 2 contains liquid sulfur dioxide. Tank 3 contains the hydrocarbon to be sulfonated. Tanks 1, 2 and 3 are supported upon scales 4, 5 and 6 so that the contents of the tank may from time to time be weighed. Tanks 1 and 2 are provided with pressure gauges 7 and 8, respectively, and also with connections 9 and 10 for introducing liquid $SO_2$ from pipe 11. Tanks 1, 2 and 3 are provided with bottom outlets and valves 12, 13 and 14, respectively, for controlling the flow of the contents thereof into pipes 15, 16 and 17, respectively. The liquid sulfur dioxide containing dissolved $SO_3$ flowing through pipe 15 passes through flow meter 18, then through pipe 19 and enters mixing nozzle 20. Likewise, the flow of liquid $SO_2$ in pipe 16 passes through flow meter 21 into pipe 22.

The hydrocarbon in tank 3 flows by means of pipe 17 into pump 39, whereby it is forced through pipe 23 into flow meter 24 and pipe 25. The respective liquids flowing in pipes 22 and 25 are combined in pipe 26, wherein the hydrocarbon dissolves in the liquid sulfur dioxide forming a solution thereof. Pipe 26 connects with nozzle 20.

Nozzle 20 is contained within chamber 27 which may be an empty tank of relatively large volume or preferably a tower provided with a packed section 28 consisting of Raschig rings or other suitable packing material. The ends of the tower are closed by means of flanges 29 and 30. An exit for liquid sulfonation product is provided at 31 and a gas exit is provided at 32. Pipe 33 connects with an additional liquid-gas separator 34 also provided with liquid outlet 35 and gas outlet 36. The sulfonated product is withdrawn mainly by means of pipe 31 with usually a small amount being recoverable at the outlet of pipe 35. The vaporized $SO_2$ leaving gas separator 34 by means of pipe 36 may be compressed and liquefied by means not shown and returned as liquid sulfur dioxide to pipe 11 for reuse in the process.

For control purposes a manometer 37 is provided for indicating the pressure in collecting zone 27. A thermocouple 38 is also provided with its junction adjacent nozzle 20 for indicating the temperature of the nozzle and the contents therein.

The process may be illustrated by the following examples:

*Example 1*

*Benzene sulfonic acid.*—The apparatus shown in the drawing was utilized, the nozzle 20 being a 0.037" I. D. tube, 0.5" long.

Sufficient $SO_3$ is dissolved in liquid $SO_2$ in tank 1 to form a 30% by weight solution. Benzene is added to tank 3 and liquid $SO_2$ is added to tank 2. The flow of the $SO_2$—$SO_3$ solution from tank 1 is adjusted to the benzene flow from tank 3 so that slightly more than one mole of $SO_3$ is supplied to nozzle 20 for each mole of benzene entering the nozzle. The amount of $SO_2$ from tank 2 is proportioned to the benzene flow so as to give an approximately 50% by weight solution in pipe 26. During the run the temperature of the nozzle is about 25° C. Benzene monosulfonic acid in good yields is recovered from pipe 31. The temperature at the nozzle 20 was 20° C. to 35° C.

*Example 2*

*Dodecyl benzene mono-sulfonic acid.*—Sufficient $SO_3$ is dissolved in liquid $SO_2$ in tank 1 to form a 30% solution. Dodecyl benzene is loaded into tank 3 and liquid $SO_2$ is placed in tank 2. The flow of dodecyl benzene from tank 3 and $SO_2$ from tank 2 is adjusted so that the solution in pipe 26 contains approximately 65% by weight of dodecyl benzene. The flow of the $SO_2$—$SO_3$ solution from tank 1 is adjusted to supply 1.15 moles of $SO_3$ to nozzle 20 for each mole of dodecyl benzene supplied by pipe 26 to nozzle 20. The nozzle is of the same dimensions as in Example 1. The temperature measured at the nozzle was 25° C. to 35° C.

*Example 3*

*Dodecyl benzene disulfonate.*—The disulfonation of dodecyl benzene is carried out as described in Example 2, except that 2 moles of $SO_3$ (dissolved in $SO_2$) is supplied to nozzle 20 per mole of dodecyl benzene (dissolved in $SO_2$). The temperature of the nozzle was 33° C., and the pressure drop was 50 pounds per square inch. The product was recovered at the rate of 8 pounds per hour and consisted of the disulfonate of dodecyl benzene in substantially quantitative amounts.

*Example 4*

*Pentasulfonate of dodecyl benzene.*—The pentasulfonate of dodecyl benzene was prepared as in Example 2, except that 5 moles of $SO_3$ was supplied to nozzle 20 per mole of dodecyl benzene supplied. The dodecyl benzene was supplied as a 58% solution in $SO_2$. The $SO_3$ was supplied as a 30% solution in $SO_2$. The nozzle temperature was 63° C. The pressure drop across the nozzle was 50 pounds per square inch.

*Example 5*

*Hexadecane hydroxy-sulfonate.*—A 25% solution of $SO_3$—$SO_2$ was prepared and supplied to nozzle 20 simultaneously with a 50% solution of hexadecene dissolved in $SO_2$. The flow to nozzle 20 was proportioned so that 2 moles of $SO_3$ was supplied per mole of hexadecene. The addition product of $SO_3$ and hexadecene was recovered from pipe 31, added to water and then neutralized with caustic soda. The resulting solution of hexadecane sodium-hydroxy-sulfonate was drum dried and recovered as a finely divided, white powder.

The amount of $SO_2$ employed should be sufficient to dissolve the reactants. Any $SO_2$ beyond that necessary for dissolving the reactants is not critical, since it merely evaporates after leaving the nozzle and can be recovered and reused. Such excess of $SO_2$ has no appreciable effect upon the pressure drop or upon the temperature of the sulfonation reaction. Since the products of the reaction are dry and pure, it is only necessary to recompress and liquify the $SO_2$ in order that it may be recovered.

A calculation of the pressure drop across the nozzle, assuming that the flow remained entirely liquid, gave a value of only 0.20 pound per square inch. The actual pressure drop which is in excess of 40 pounds, but less than 100 pounds per square inch, depending upon the heat of sulfonation of the compound involved, is thought to be due to the fact that the $SO_2$ is vaporized in the nozzle.

*Example 6*

*Carbyl sulfate.*—Ethylene gas is dissolved in liquid $SO_2$ in quantities sufficient to form a 25% solution. This solution is fed to nozzle 20 by means of pipe 26. A 30% solution of $SO_3$ in $SO_2$ is also prepared and fed to nozzle 20 by means of pipe 19. The respective flows are proportioned so as to supply 2 moles of $SO_3$ for each mole of ethylene supplied. The carbyl sulfate is obtained from outlet 31 and may be hydrated by addition to cold water to form ethionic acid. By treating carbyl sulfate with warm water isethionic acid is formed.

What I claim is:

1. In the process of sulfonation wherein a stream of liquid $SO_2$ containing dissolved $SO_3$ is mixed with a stream of liquid $SO_2$ containing a dissolved hydrocarbon which contains at least one grouping of the type: —CH=CH—, whereby said hydrocarbon is sulfonated and heat of sulfonation is liberated, the step of flowing said mixed streams through a nozzle and completely evaporating said liquid $SO_2$ within said nozzle solely by means of said heat of sulfonation, whereby said $SO_3$ becomes combined with said hydrocarbon at a temperature of at least 20° C.

2. In the process of sulfonation in which a stream of liquid $SO_2$ containing dissolved $SO_3$ is mixed with a stream of liquid $SO_2$ containing a dissolved hydrocarbon which contains at least one group of the type: —CH=CH—, whereby said hydrocarbon is sulfonated and heat of sulfonation is liberated, the step of flowing said mixed streams through a nozzle into a zone of lower pressure, complete evaporation of liquid $SO_2$ occurring within said nozzle solely by means of said heat of sulfonation, the pressure drop across the nozzle being at least 40 pounds per square inch.

3. In the process of sulfonation in which a stream of liquid $SO_2$ containing dissolved $SO_3$ is mixed with a stream of liquid $SO_2$ containing a dissolved hydrocarbon which contains at least one group of the type: —CH=CH—, whereby said hydrocarbon is sulfonated and heat of sulfonation is evolved, the step of flowing said mixed streams into and through a nozzle at a temperature of at least 20° C., wherein complete evaporation of liquid $SO_2$ occurs solely by means of said heat of sulfonation and recovering a sulfonation product.

4. In the process of sulfonation in which a stream of liquid $SO_2$ containing dissolved $SO_3$ is mixed with a stream of liquid $SO_2$ containing a dissolved hydrocarbon which contains at least one group of the type: —CH=CH—, whereby said hydrocarbon is sulfonated and heat of sulfonation is evolved, the steps of mixing said streams and flowing the so-formed mixture through a nozzle, wherein complete evaporation of liquid $SO_2$ occurs solely by means of said heat of sulfonation and under substantially adiabatic conditions, said mixture thence flowing into a collection zone maintained at substantially atmospheric pressure.

5. In the process of sulfonation in which a stream of liquid $SO_2$ containing dissolved $SO_3$ is mixed with a stream of liquid $SO_2$ containing a dissolved sulfonatable hydrocarbon, whereby said hydrocarbon is sulfonated, and heat of sulfonation evolved, the steps of flowing said streams together into a nozzle whereby complete evaporation of liquid $SO_2$ occurs solely by means of said heat of sulfonation and without substantial gain or loss of heat by said flowing stream, and spraying said stream into a zone of reduced pressure.

6. In the process of sulfonation in which a stream of liquid $SO_2$ containing dissolved $SO_3$ is mixed with a stream of liquid $SO_2$ containing a dissolved sulfonatable hydrocarbon, whereby said hydrocarbon is sulfonated, and heat of sulfonation evolved, the steps of flowing said streams together into and through a confined zone without substantial gain or loss of heat by said flowing stream, and wherein complete evaporation of liquid $SO_2$ occurs solely by means of said heat of sulfonation, and then spraying said stream into a zone maintained at substantially atmospheric pressure.

JOHN K. FINCKE.

REFERENCES CITED

The following references are of record in the file of this patent:

UNITED STATES PATENTS

| Number | Name | Date |
|---|---|---|
| Re. 22,548 | Brandt | Sept. 26, 1944 |
| 1,843,012 | Bucherer | Jan. 26, 1932 |
| 2,007,510 | Thornton | July 9, 1935 |
| 2,187,244 | Mills | Jan. 16, 1940 |
| 2,285,390 | Brandt | June 9, 1942 |
| 2,290,167 | Datin | July 21, 1942 |

FOREIGN PATENTS

| Number | Country | Date |
|---|---|---|
| 539,281 | Great Britain | Sept. 3, 1941 |